US006718370B1

United States Patent
Coffman et al.

(10) Patent No.: US 6,718,370 B1
(45) Date of Patent: Apr. 6, 2004

(54) COMPLETION QUEUE MANAGEMENT MECHANISM AND METHOD FOR CHECKING ON MULTIPLE COMPLETION QUEUES AND PROCESSING COMPLETION EVENTS

(75) Inventors: Jerrie L. Coffman, Beaverton, OR (US); Mark S. Hefty, Aloha, OR (US); Fabian S. Tillier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,875

(22) Filed: Mar. 31, 2000

(51) Int. Cl.[7] ............................................. G06F 15/16
(52) U.S. Cl. ...................................... 709/212; 709/250
(58) Field of Search ................................ 709/212, 250, 709/318

(56) References Cited

U.S. PATENT DOCUMENTS

| | | | | |
|---|---|---|---|---|
| 5,517,662 A | * | 5/1996 | Coleman et al. | 709/201 |
| 5,875,343 A | * | 2/1999 | Binford et al. | 710/263 |
| 6,347,337 B1 | * | 2/2002 | Shah et al. | 709/224 |
| 6,457,064 B1 | * | 9/2002 | Huff et al. | 709/318 |
| 2002/0062402 A1 | * | 5/2002 | Regnier et al. | 709/313 |

OTHER PUBLICATIONS

Virtual Interface Architectrue Specification, Draft Rev. 1.0, pp. 1–83, Dec. 4, 1997.*
Sellin, C., Extension to the Current VI APIs, www.vidf.org/vidf-all/att-newapis.pdf, pp. 1–6, Dec. 5, 1999.*
Zabatta, F., et al., A Thread Performance Comparison: Windows NT and Solaris on A Symmetric Multiprocessor, Proc. of the 2nd USENIX Windows NT Symposium, pp. 1–11, Aug. 4, 1998.*
Intel Virtual Interface (VI) Architecture Developer's Guide, rev. 1.0, Intel Corp., pp. 1–94, Sep. 9, 1998.*
Intel Kernel Virtual Inteface Provider Library (KVIPL) Addendum, Intel Corp., pp. 1–55, Mar. 25, 1999.*
Giganet VI Architecture Software Deverloper's Kit, Giganet, Inc., pp. 1–20, Mar. 1999.*

* cited by examiner

Primary Examiner—Andrew Caldwell
(74) Attorney, Agent, or Firm—Rob Anderson

(57) ABSTRACT

A host system is provided one or more hardware adapters; multiple work queues each configured to send and receive message data via said one or more hardware adapters; multiple completion queues each configured to coalesce completions from multiple work queues belonging to a single hardware adapters; and a completion queue management mechanism configured to check for completions across multiple completion queues in the context of either a single thread or multiple threads of operation.

27 Claims, 15 Drawing Sheets

EXAMPLE SOFTWARE DRIVER STACKS FOR HOST SYSTEM

FIG. 7
Completion Service
- Monitor( WQP, Direction )
- StopMonitoring( WQP, Direction )
- CheckRequest()
- CheckWithReset()
OutboundCqList
InboundCqList
CompletionEvent
CompletionThread(s)

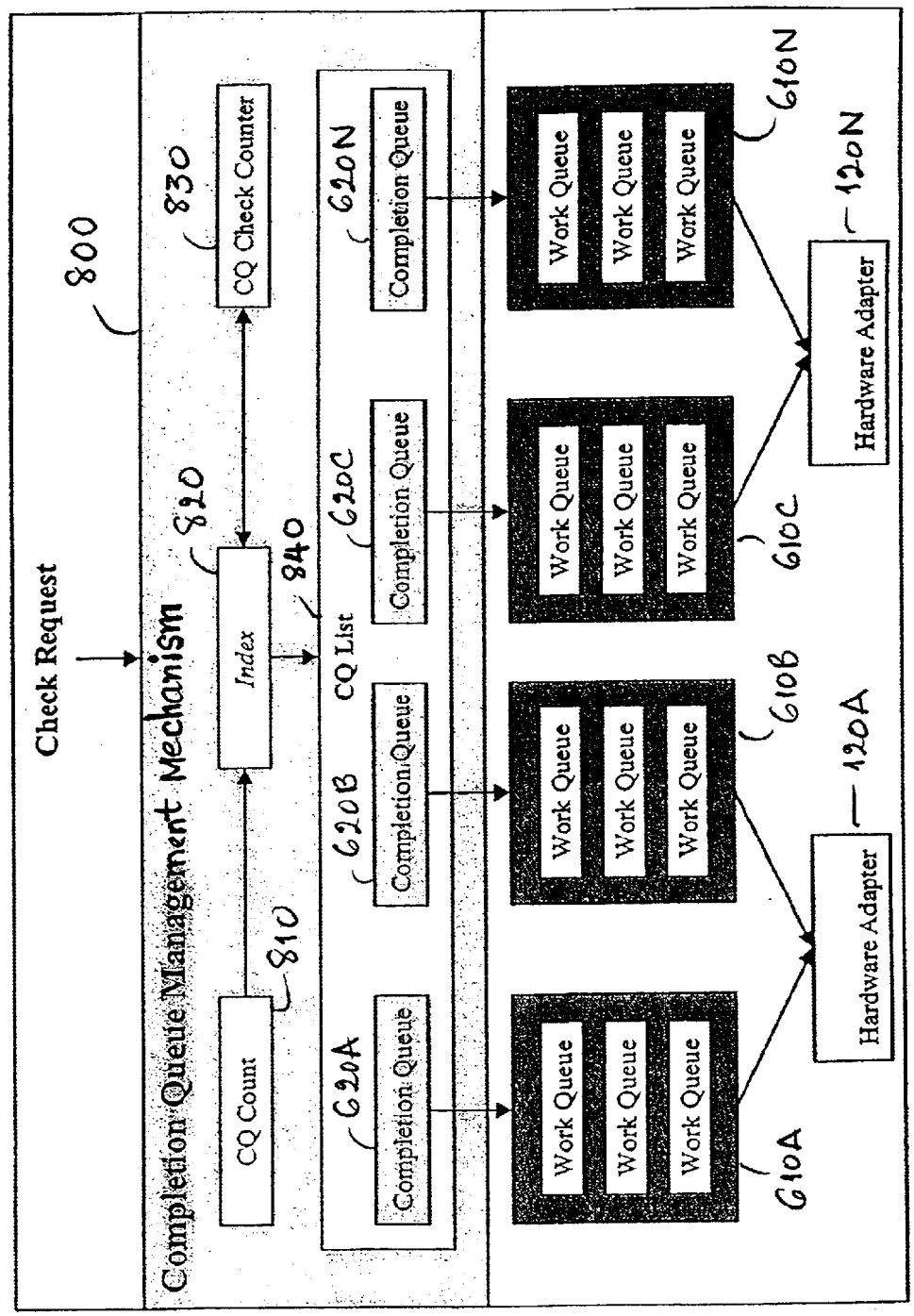

| TIME | CQ 0 | CQ 1 | CQ 2 | CQ 3 |
|---|---|---|---|---|
| P | ☒ | | | |
| P + 1 | | ☑ | | |
| ... | | | | |
| 2P | | | ☒ | |
| 2P + 1 | | | | ☑ |

TABLE 1 - SINGLE THREAD EXAMPLE COMPLETION QUEUE CHECK

FIG. 9A

| TIME | CQ 0 | CQ 1 | CQ 2 | CQ 3 |
|---|---|---|---|---|
| P | 1 - ☒ | 2 - ☑ | | |
| P + 1 | | | 1 - ☒ | |
| P + 2 | | | | 1 - ☑ |
| ... | | | | |
| 2P | 1 - ☑ | 2 - ☒ | | |
| 2P + 1 | | | 2 - ☒ | |
| 2P + 2 | | | | 2 - ☒ |
| 2P + 3 | 2 - ☒ | | | |

TABLE 2 - MULIT-THREAD EXAMPLE COMPLETION QUEUE CHECK

FIG. 9B

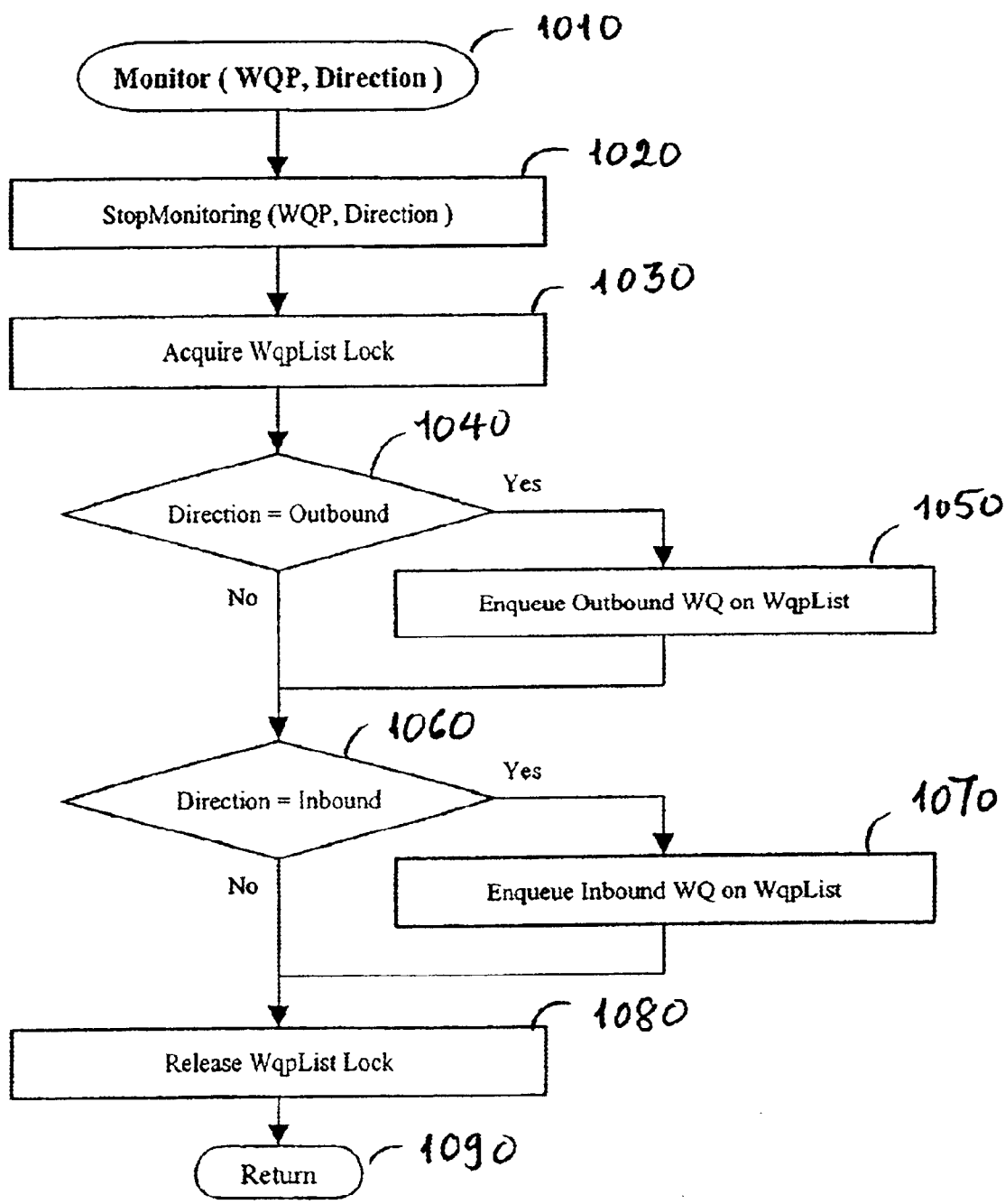

CheckRequest

CheckWithReset

CheckRequest Alternate #1

CheckRequest Alternate #2

COMPLETION QUEUE MANAGEMENT MECHANISM AND METHOD FOR CHECKING ON MULTIPLE COMPLETION QUEUES AND PROCESSING COMPLETION EVENTS

TECHNICAL FIELD

The present invention relates to a data network, and more particularly, relates to a completion queue management mechanism and an algorithm for checking on multiple completion queues and processing completion events in such a data network.

BACKGROUND

A data network is generally consisted of a network of nodes connected by point-to-point links. Each physical link may support a number of logical point-to-point channels. Each channel may be a bi-directional communication path for allowing commands and message data to flow between two connect nodes within the data network. Each channel may refer to a single point-to-point connection where message data may be transferred between two endpoints or systems. Data may be transmitted in packets including groups called cells from source to destination often through intermediate nodes.

In many data networks, hardware and software may often be used to support asynchronous data transfers between two memory regions, often on different systems. Each host system may serve as a source (initiator) system which initiates a message data transfer (message send operation) or a target system of a message passing operation (message receive operation). Examples of such a system may include host servers providing a variety of applications or services and I/O units providing storage oriented and network oriented IO services. Requests for work (data movement operations including message send/receive operations and remote direct memory access "RDMA" read/write operations) may be posted to work queues associated with a given hardware adapter, the requested operation may then be performed. It is the responsibility of the system which initiates such a request to check for its completion.

In order to optimize use of limited system resources, completion queues may be provided to coalesce completion status from multiple work queues belonging to a single hardware adapter. After a request for work has been performed by system hardware, notification of a completion event may be placed on the completion queue. Completion queues may provide a single location for system hardware to check for multiple work queue completions.

Completion queues may support two models of operation. In the first model, when an item is placed on the completion queue, an event may be triggered to notify the requester of the completion. This may often be referred to as an interrupt-driven model. In the second model, an item is simply placed on the completion queue, and no event may be signaled. It is then the responsibility of the request system to periodically check the completion queue for completed requests. This may be referred to as polling for completions.

However, completion queues are bound to a single hardware adapter of a host system in a data network, such completion queues cannot coalesce completions from work queues that reside on separate hardware adapters. Moreover, expensive locking or serialization routines are required to manage completion polling operations to multiple completion queues without starvation. Accordingly, there is a need for a single completion service to monitor multiple work queues in a host system with multiple hardware adapters while flexibly supporting both polling and event-driven completion operation models. Also needed is a performance-efficient completion queue management mechanism for checking multiple completion queues in the context of either a single thread or multiple threads of operation without the need for expensive locking or serialization techniques and processing completion events for optimal use of limited system resources.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIG. 7 illustrates an example completion service architecture of kernel-level device drivers of a host operating system (OS) of an example data network according to an embodiment of the present invention;

FIG. 8 illustrates an example overview of a completion queue management mechanism employed in kernel-level device drivers of a host operating system (OS) for providing completion services including managing multiple completion queues according to an embodiment of the present invention;

FIGS. 9A–9B illustrate single and multiple thread example completion queue checking operations provided by the completion queue management mechanism according to an embodiment of the present invention;

FIG. 10 illustrates an example completion queue monitoring process performed by an example completion queue management mechanism for monitoring work queues for inbound and outbound completions according to an embodiment of the present invention;

DETAILED DESCRIPTION

The present invention is applicable for use with all types of computer networks, I/O hardware adapters and chipsets, including follow-on chip designs which link together end stations such as computers, servers, peripherals, storage devices, and communication devices for data communications. Examples of such computer networks may include local area networks (LANs), wide area networks (WANs), campus area networks (CANs), metropolitan area networks (MANs), global area networks (GANs), wireless personal area networks (WPANs), and system area networks (SANs), including newly developed computer networks using Next Generation I/O (NGIO), Future I/O (FIO), System I/O and Server Net and those networks including channel-based, switched fabric architecture which may become available as computer technology advances to provide scalable performance. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a completion queue management mechanism provided at a host system including one or more hardware adapters for providing a single completion service to check for completion events across completion queues and processing completion events in a simple data network having several example nodes (e.g., computers, servers and I/O units) interconnected by corresponding links and switches, although the scope of the present invention is not limited thereto.

Figure 1:
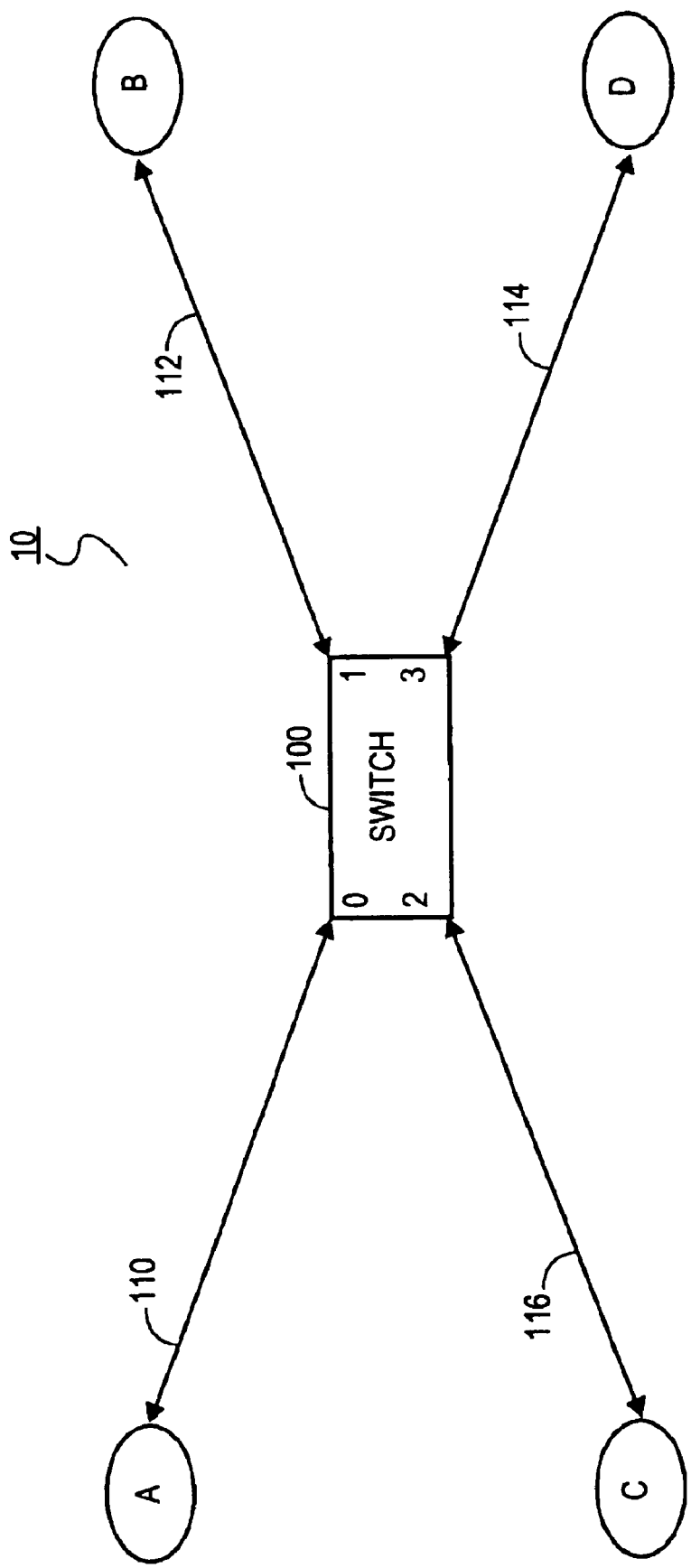
FIG. 1 illustrates an example data network having several nodes interconnected by corresponding links of a basic switch according to an embodiment of present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more I/O controllers connected thereto. Each I/O controller may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "*Next Generation Input/Output (NGIO) Specification*" as set forth by the NGIO Forum on Jul. 20, 1999. According to the NGIO Specification, the switch 100 may be an NGIO switched fabric (e.g., collection of links, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric hardware adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO channel(s).

Figure 2:
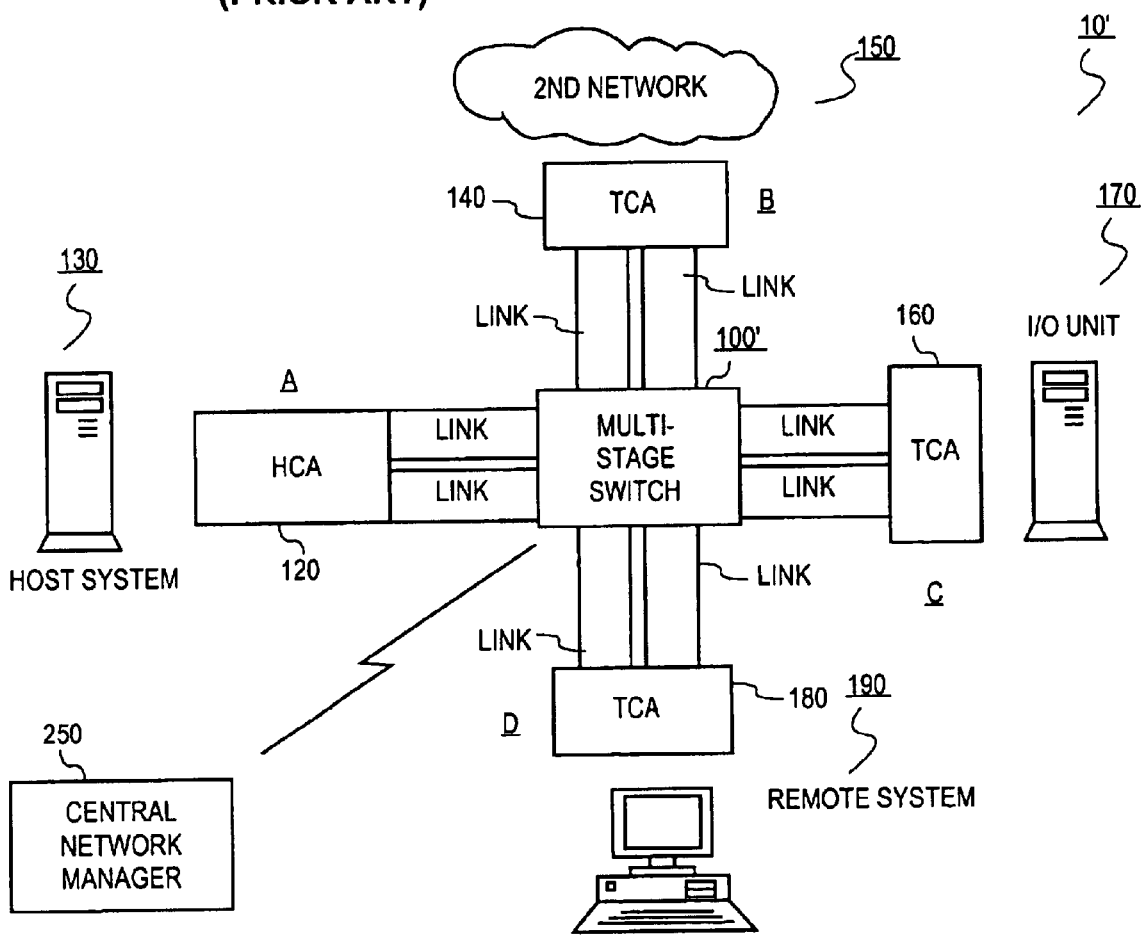
FIG. 2 illustrates another example data network having several nodes interconnected by corresponding links of a multi-stage switched fabric according to an embodiment of the present invention.

For example, FIG. 2 illustrates an example data network 10 using an NGIO architecture to transfer data from a source node to a destination node according to an embodiment of the present invention. As shown in FIG. 2, the data network 10' includes an NGIO fabric 100' (multi-stage switched fabric comprised of a plurality of switches) for allowing a host system and a remote system to communicate to a large number of other host systems and remote systems over one or more designated channels. A single channel may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any ones of remote systems. In addition, any number of end stations, switches and links may be used for relaying data in groups of cells between the end stations and switches via corresponding NGIO links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the multi-stage switched fabric 100' which serve as intermediate nodes between the host system 130 and the remote systems 150, 170 and 190.

The multi-stage switched fabric 100' may include a central network manager 250 connected to all the switches for managing all network management functions. However, the central network manager 250 may alternatively be incorporated as part of either the host system 130, the second network 150, the I/O unit 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the host system 130 and a multi-stage switched fabric 100 via high speed serial NGIO links. Similarly, target channel adapters (TCA) 140 and 160 may be used to provide an interface between the multi-stage switched fabric 100' and an I/O controller of either a second network 150 or an I/O unit 170 via high speed serial NGIO links. Separately, another target channel adapter (TCA) 180 may be used to provide an interface between a memory controller (not shown) of the remote system 190 and the multi-stage switched fabric 100' via high speed serial NGIO links. Both the host channel adapter (HCA) and the target channel adapter (TCA) may be broadly considered as fabric hardware adapters provided to interface either the host system 130 or any one of the remote systems 150, 170 and 190 to the switched fabric, and may be implemented in compliance with "*Next Generation I/O Link Architecture Specification: HCA Specification, Revision* 1.0" as set forth by NGIO Forum on May 13, 1999 for enabling the endpoints (nodes) to communicate to each other over an NGIO channel(s). However, NGIO is merely one example embodiment or implementation of the present invention, and the invention is not limited thereto. Rather, the present invention may be applicable to a wide variety of any number of data networks, hosts and I/O units.

Figure 3:
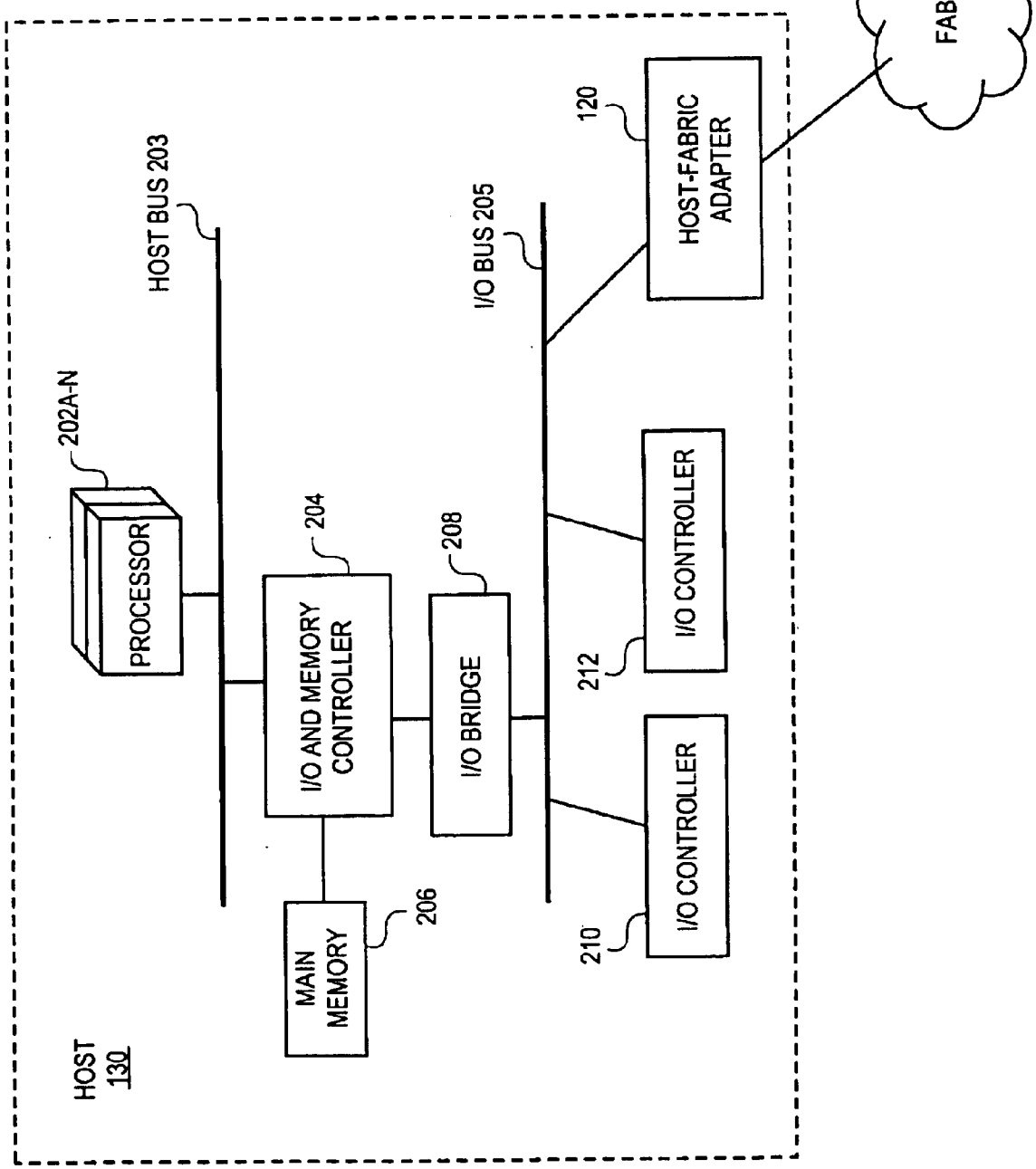
FIG. 3 illustrates a block diagram of an example host system of an example data network according to an embodiment of the present invention.

One example embodiment of a host system 130 may be shown in FIG. 3. Referring to FIG. 3, the host system 130 may include one or more processors 202A–202N coupled to a host bus 203. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4:
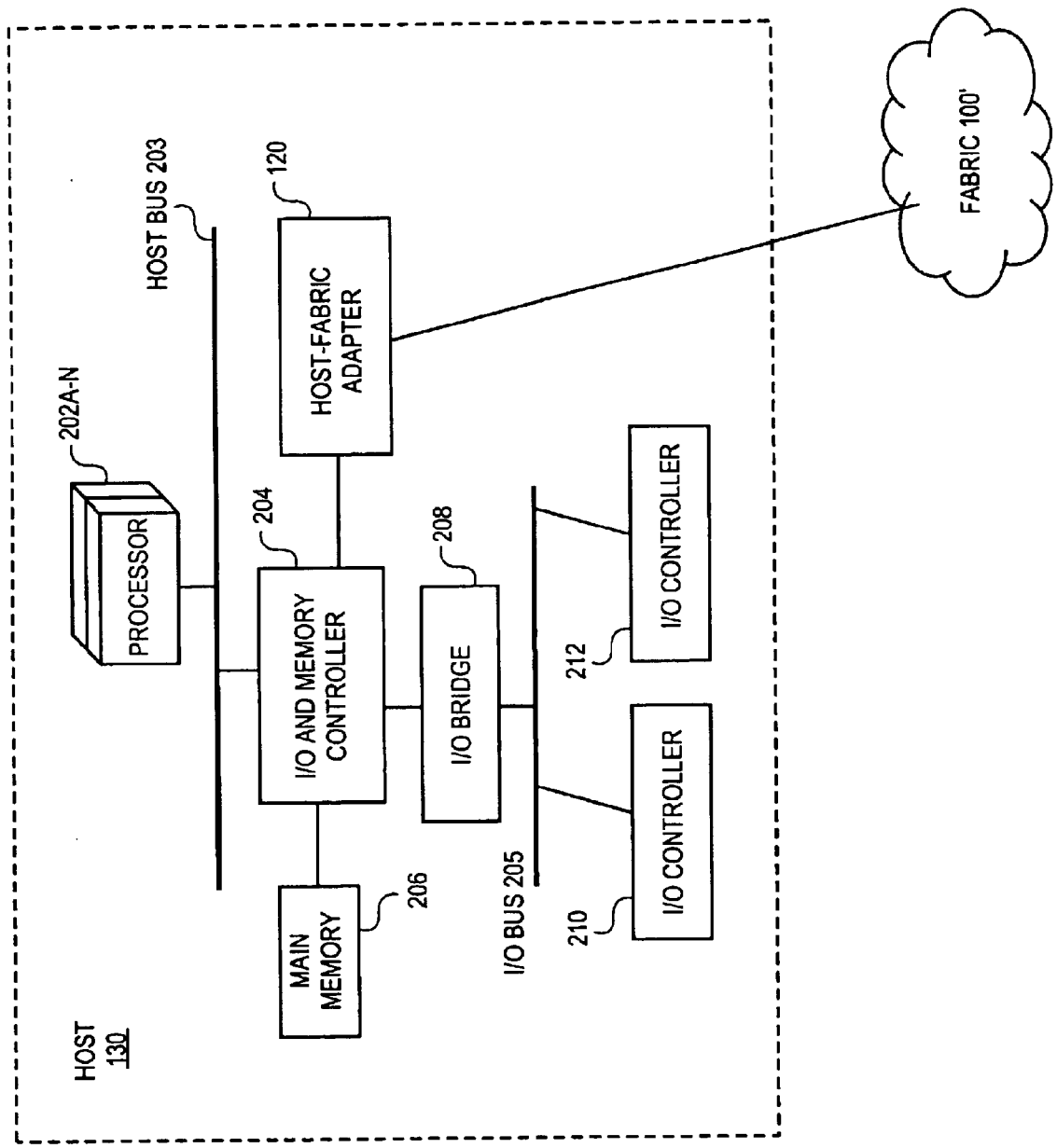
FIG. 4 illustrates a block diagram of an example host system of an example data network according to another embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment shown in FIGS. 3–4, one or more host-fabric adapters 120 may be provided to interface the host system 130 to the multi-stage switched fabric 100'.

FIGS. 3–4 merely illustrate example embodiments of a host system 130. A wide array of system configurations of such a host system 130 may be available. A software driver stack for the host-fabric adapter 120 may also be provided to allow the host system 130 to exchange data with one or more remote systems 150, 170 and 190 via the switched fabric 100', while preferably being compatible with many currently available operating systems, such as Windows 2000.

Figure 5:
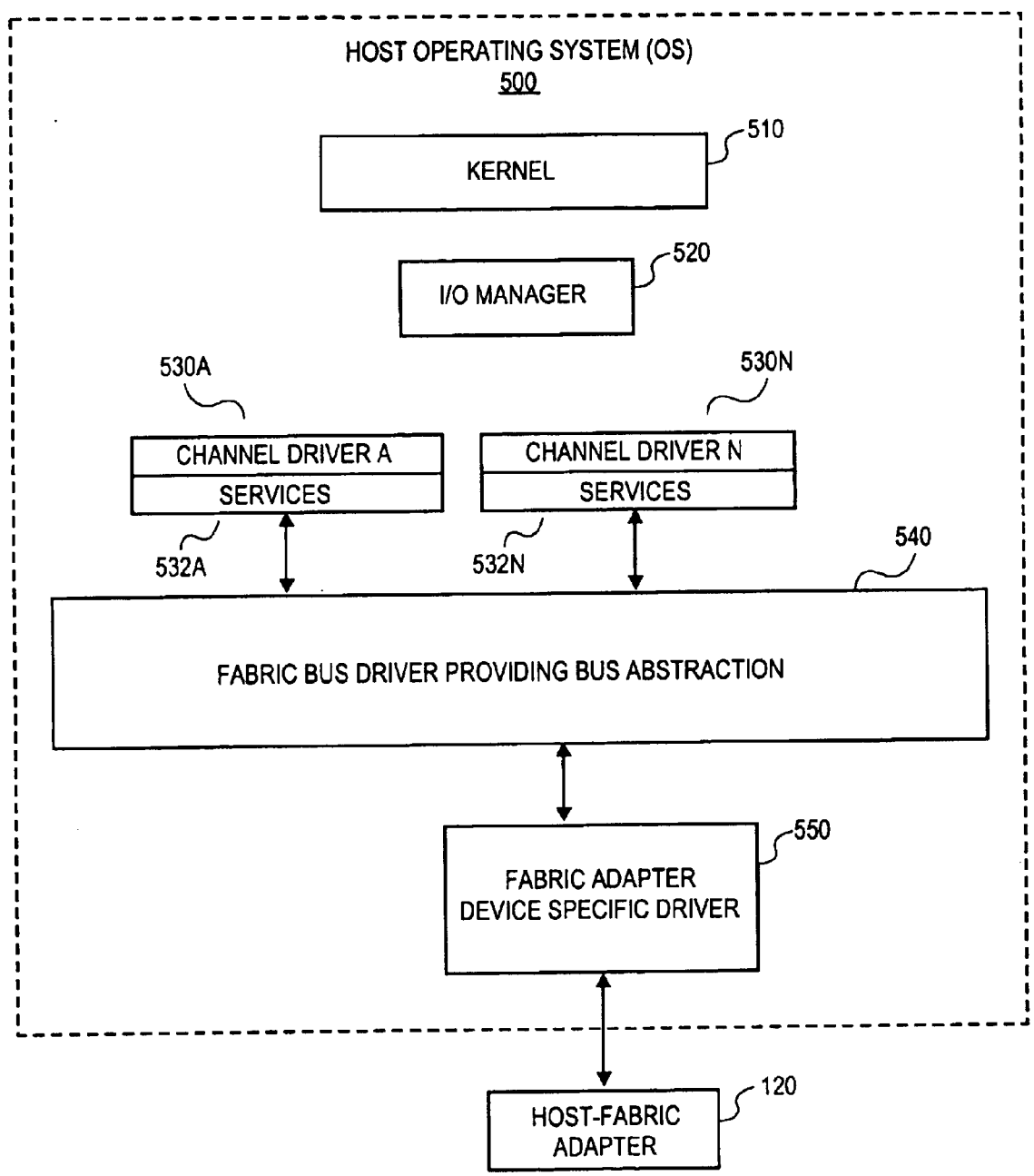
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and a fabric adapter device-specific driver 550 utilized to establish communication with a remote fabric-attached agent (e.g., I/O controller), and perform functions common to most drivers. Such a host operating system (OS) 500 may be Windows 2000, for example, and the I/O manager 520 may be a Plug-n-Play manager.

The host-fabric adapter software stack (driver module) may be provided to access the switched fabric 100' and information about fabric configuration, fabric topology and connection information. Such a host-fabric adapter software stack (driver module) may be utilized to establish communication with a remote fabric-attached agent (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification.*" For example, the HCA service layer (HSL) may be inherent to all channel drivers 530A–530N for providing a set of common fabric services in a service library, including connection services, resource services, and HCA services required by thel channel drivers 530A–530N to instantiate and use NGIO channels for performing data transfers over the NGIO channels. The fabric bus driver 540 may correspond to the HCA abstraction layer (HCAAL) for managing all of the device-specific drivers, controlling shared resources common to all HCAs in a host and resources specific to each HCA in a host system 130, distributing event information to the HSL and controlling access to specific device functions. Likewise, the device-specific driver 550 may correspond to the HCA device-specific driver for providing an abstract interface to all of the initialization, configuration and control interfaces of an HCA.

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the *"Virtual Interface (VI) Architecture Specification, Version 1.0,"* as set forth by Compaq Corp., Intel Corp., and Microsoft Corp., on Dec. 16, 1997. NGIO and VI architectures support asynchronous data transfers between two memory regions, typically on different systems over one or more designated channels of a data network. Each system using a VI Architecture may contain work queues formed in pairs including inbound and outbound queues in which requests, in the form of descriptors, are posted to describe data movement operation and location of data to be moved for processing and/or transportation via a NGIO switched fabric. The VI Specification defines VI mechanisms for low-latency, high-bandwidth message-passing between interconnected nodes connected by multiple logical point-to-point channels. Other architectures may also be used to implement the present invention.

Figure 6:
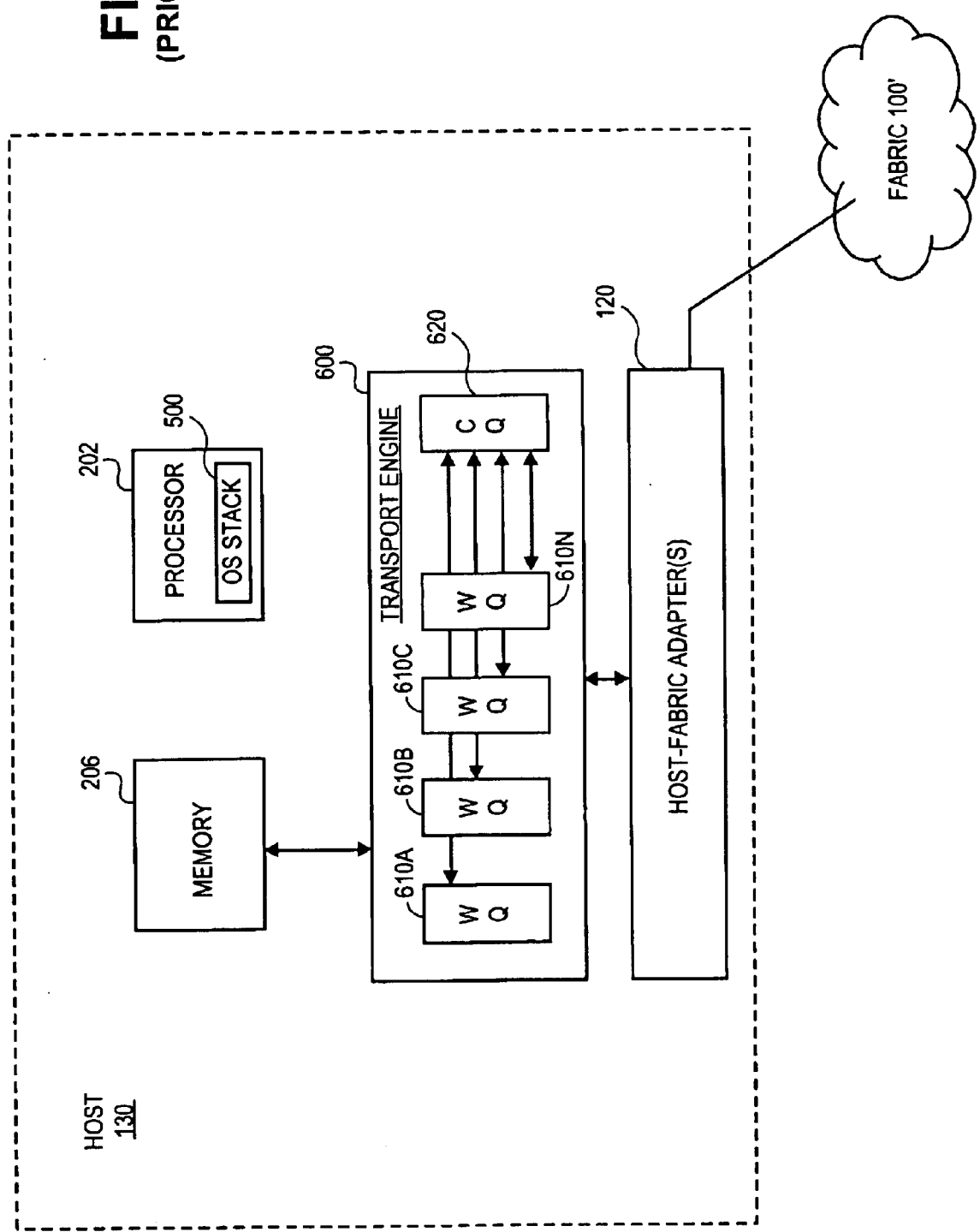
FIG. 6 illustrates a block diagram of an example host system using Next Generation I/O (NGIO) and Virtual Interface (VI) architectures to support asynchronous data transfers via a switched fabric of an example data network according to an embodiment of the present invention.

FIG. 6 illustrates an example host system using NGIO and VI architectures to support asynchronous data transfers via a switched fabric 100'. As shown in FIG. 6, the host system 130 may include, in addition to one or more processors 202 including an operating system (OS) stack 500, a host memory 206, and one or more host-fabric adapters (HCAs) 120 as shown in FIGS. 3–5, a transport engine 600 provided in accordance with NGIO and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound and outbound queues, such as work queues (WQ) 610A–610N in which requests, in the form of descriptors, may be posted to describe data movement operation and location of data to be moved for processing and/or transportation via a switched fabric 100', and completion queues (CQ) 620 may be used to check for completions. Such a transport engine 600 may be hardware memory components of a host memory 206 which resides separately from one or more host-fabric adapters 120 so as to process completions from multiple host-fabric adapters 120. Alternatively, such a transport engine 600 may also be provided as part of kernel-level device drivers of an operating system (OS). In one embodiment, each work queue pair (WQP) including separate inbound and outbound queues has a physical port into a switched fabric 100' via a host-fabric adapter 120. However, in other embodiments, all work queues may share physical ports into a switched fabric 100' via one or more host-fabric adapters 120. The outbound queue of the work queue pair (WQP) may be used to request message sends, remote direct memory access "RDMA" reads, and remote direct memory access "RDMA" writes. The inbound queue may be used to receive messages.

In such an example data network, NGIO and VI hardware and software may be used to support asynchronous data transfers between two memory regions, often on different systems. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Requests for work (data movement operations including message send/receive operations and RDMA read/write operations) may be posted to work queues (WQ) 610A–610C associated with a given hardware adapter (HCA), the requested operation may then be performed. It is the responsibility of the system which initiates such a request to check for its completion.

In order to optimize use of limited system resources, completion queues (CQ) 620 may be provided to coalesce completion status from multiple work queues (WQ) 610A–610N belonging to a single hardware adapter (HCA) 120. After a request for work has been performed by system hardware, notification of a completion event may be placed on the completion queues (CQ) 620. Completion queues may provide a single location for system hardware to check for multiple work queue completions. Such completion queues (CQ) 620 may also support both polling and interrupt (event) driven completion models. However, these completion queues (CQ) 620 are bound only to a single hardware adapter (HCA) 120 of a host system. As a result, such completion queues (CQ) cannot coalesce completions from work queues (WQ) that reside on separate hardware adapters (HCAs) 120. Moreover, expensive locking or serialization routines are required to manage completion polling operations to multiple completion queues (CQ). Accordingly, there is a need for a single completion service to monitor multiple work queues (WQ) 610A–610N in a host system with multiple hardware adapters (HCAs) with multiple ports available for redundancy and multiple switched fabrics while ensuring that a completion queue does not starve (is never checked) and flexibly supporting both polling and event-driven completion operation models. Also needed is a performance-efficient completion queue management mechanism for checking multiple completion queues (CQ) in the context of either a single thread or multiple threads of operation without the need for expensive locking or serialization techniques and processing completion events for optimal use of limited system resources.

Turning now to FIG. 7, in which an overview completion service architecture of a host system 130 for providing a set of services useful for performing data transfers according to an embodiment of the present invention is illustrated. A single completion service may be provided as part of services provided by the service library (see FIG. 5, channel drivers 530A–530N), or alternatively, as part of an user-level application of a host system 130 (see FIGS. 2–4), including checking on multiple completion queues and processing completion events across multiple hardware adapters (HCAs) as opposed to a single hardware adapter (HCA). The completion service may also be responsible for invoking any necessary post processing, including user callback routines used to notify the user of the completed operation and processing completions across multiple work queues on multiple host channel adapters (HCAs) to avoid system interrupts while supporting both polling and interrupt (event) driven completion models.

As shown in FIG. 7, the completion service may be provided with a Monitor( ) function (WQP, Direction), a StopMonitoring function (WQP, Direction), a CheckRequest( ) function, a CheckWithReset( ) function, an OutboundCQList, an InboundCQList, a Completion Event, and Completion Threads of operation. In addition, CheckRequest( ) Alternate #1 and CheckRequest( ) Alternate #2 may also be alternatively provided in lieu of the CheckRequest( ) function.

The Monitor( ) function may be invoked by a user to begin monitoring different inbound (receive) and outbound (send) work queues of a work queue pair WQP for inbound and outbound completions, respectively. This is because the inbound (receive) and outbound (send) work queues of a work queue pair (WQP) operate independently and must be monitored independently from their respective WQ list. However, both the inbound (receive) and outbound (send) work queues of a WQP can be monitored by the same completion service. The Monitor( ) function may be invoked by the user so as to add the work queues WQs to be monitored to the WQ list for subsequent functions, such as the CheckRequest( ) function, and CheckRequest( ) Alternate #1 and Alternate #2 functions.

The Monitor( ) function may be executed by the following pseudo-code algorithm which is not software specific, and may be implemented using high-level programming languages such as C, C++ and Visual Basic as part of the software driver module of an operating system (OS) kernel or an user-level application of a host system 130 (see FIGS. 2–6).

```
Monitor(WQP, Direction)
{
StopMonitoring(WQP, Direction)
Acquire WqpList Lock
If Direction indicates Outbound then
    Enqueue the Outbound WQ on WqpList
If Direction indicates Inbound then
    Enqueue the Inbound WQ on WqpList
Release WqpList Lock
}
```

The StopMonitoring( ) function may be invoked by a user to stop monitor the different inbound (receive) and outbound (send) work queues of a WQP for inbound and outbound completions from respective WQ list so as to allow entry addition or removal from respective inbound and outbound WQ list.

The StopMonitoring( ) function may be executed by the following pseudo-code algorithm which is likewise not software specific, and may be implemented using high-level programming languages such as C, C++ and Visual Basic as part of the software driver module of an operating system (OS) kernel or an user-level application of a host system 130 (see FIGS. 2–6)

```
StopMonitoring(WQP, Direction)
{
Acquire WqpList Lock
While not end of WqpList
{
  If Direction indicates Outbound and WqpList entry=
    Outbound WQ then
  {
    Dequeue Outbound WQ from WqpList
    Break
  }
  If Direction indicates Inbound and WqpList entry=
    Inbound WQ then
  {
    Dequeue Inbound WQ from WqpList
    Break
  }
  Go to next WqpList entry
}
Release WqpList Lock
}
```

The CheckRequest( ) function may be invoked directly by the user polling for completion events or indirectly by a CompletionEvent triggered by a completion to check for and process completed descriptors on all work queues monitored by the completion service. If a CompletionEvent is used, a Completion Thread may respond to the event and process completed descriptors posted to the work queues (WQ). After a completion service locates a completed descriptor, the completed descriptor may be processed, i.e., removed from the work queue WQ and information relating to the request stored with the descriptor may be retrieved. The request information may then provide a callback routine along with context to return to the user (service library) through the callback function to notify the user that a request has completed.

The CheckRequest( ) function may be executed by the following pseudo-code algorithm which may be implemented using high-level programming languages such as C, C++ and Visual Basic as part of the software driver module of an operating system (OS) kernel or an user-level application of a host system 130 (see FIGS. 2–6).

```
CheckRequest( )
{
Do
{
  Completion=FALSE
  Check Number=0
  while Check Number<CQ Count
  {
    Index=InterlockedIncrement(CQ Check Counter)
      mod CQ Count
    If CQ List[Index] has a completed request
    {
      Remove the completed request from CQ List
        [Index]
      Return the completed request to user for process-
        ing
      Completion=TRUE
    }
    Increment Check Number
  } }
} While Completion==TRUE
}
```

The CheckWithReset( ) function may be invoked by a CompletionEvent triggered by a completion to check all work queues WQs for completions, reset all work queues WQs that had completions, and then performs an additional check on the work queues WQs for completed descriptors. The additional check may be used to avoid a race condition between resetting the event and a descriptor completing. Until the CheckWithReset( ) function is invoked, work queues WQs that had completed descriptors may not trigger additional interrupts so as to allow the completion service to process multiple completions without taking unnecessary interrupts, similar to using an NGIO completion queue. However, unlike the completion queue, the completion service may monitor completions across multiple hardware adapters (HCAs). As long as descriptors complete on any of the work queues WQs monitored by the completion service, each work queue WQ monitored by that completion service may generate at most a single interrupt.

The CheckWithReset( ) function may be executed by the following pseudo-code algorithm which may be implemented using high-level programming languages such as C, C++ and Visual Basic as part of the software driver module of an operating system (OS) kernel or an user-level application of a host system 130 (see FIGS. 2–6).

```
CheckWithReset( )
{
CheckRequest( )
For each CQ in CQ List
```

```
ReArm CQ
CheckRequest( )
}
```

CheckRequest( ) Alternate #1 function and CheckRequest( ) Alternate #2 function may also be alternatively invoked in lieu of the CheckRequest( ) function to check for and process completed descriptors on all work queues monitored by the completion service. Pseudo-code algorithms for the CheckRequest( ) Alternate #1 function and CheckRequest( ) Alternate #2 function may be provided as follows:

```
CheckRequest( ) Alternate #1
{
Do
{
  Completion=FALSE
  Index=0
  While Index<CQ Count
  {
    If CQ List[Index] has a completed request
    {
      Remove the completed request from CQ List
        [Index]
      Return the completed request to user for processing
      Completion=TRUE
    }
    Increment Index
  }
} While Completion==TRUE
}
CheckRequest( ) Alternate #2
{
Do
{
  Completion=FALSE
  Check Number=0
  While Check Number<CQ Count
  {
    Acquire Lock
    Index=Next CQ to Check
    Increment Next CQ to Check
    If Next CQ to Check>CQ Count then
    {
      Next CQ to Check=0
    }
    Release Lock
    If CQ List[Index] has a completed request
    {
      Remove the completed request from CQ List
        [Index]
      Return the completed request to user for processing
      Completion=TRUE
    }
    Increment Check Number
  }
} While Completion==TRUE
}
```

However, both the CheckRequest( ) Alternate #1 function and CheckRequest( ) Alternate #2 function may not be as desirable as the CheckRequest( ) function. For instance, the CheckRequest( ) Alternate #1 may simply begin checking at CQ0 each time, stepping through the completion queues CQ1–CQ3. While coordinate activities between multiple threads may be avoided, a completion queue may possibly be starved. The CheckRequest( ) Alternate #2 may work in a similar fashion, but use a different method to determine the Index. While starvation may be avoided, multiple threads may be required to serialize their accesses setting the Index. Therefore, expensive serialization routines from the use of spinlocks may be necessary.

However, in either alternate CheckRequest( ) functions, every completion queues CQs may be checked for completions.

FIG. 8 illustrates an example overview of a completion queue management mechanism 800 of a host system 130 for maintaining a list of all monitored completion queues and performing all functions of a completion service as described with reference to FIGS. 7. Such a completion queue management mechanism 800 may be installed in kernel-level device drivers of a host operating system (OS) as part of services provided by the service library (see FIG. 5, channel drivers 530A–530N), or installed as part of an user-level application of a host system 130 (see FIGS. 2–4) which manages simultaneous requests and completions to multiple NGIO and VI completion queues. Alternatively, such a completion queue management mechanism may also be available as a firmware module or a comprehensive hardware/software module installed in channel drivers of an operating system (OS) kernel such that the channel drivers can directly access completion queues in order to reduce software overhead and obtain flexibility in handling completion events. Also, similarly to the software driver module, the completion queue management mechanism may also be independently provided on a computer tangible medium, such as memory devices; magnetic disks (fixed, floppy, and removable); other magnetic media such as magnetic tapes; optical media such as CD-ROM disks, or via Internet downloads, which may be available for a user to conveniently plug-in or download into an existing operating system (OS).

As shown in FIG. 8, the completion queue management mechanism 800 may include a completion queue CQ Count 810, an Index 820, a completion queue CQ Check Counter 830, a completion queue CQ List 840 of multiple completion queues 620A–620N, for example, CQ0–CQ3. Different work queues 610A–610N may be associated with a different NGIO or VI hardware adapter (HCA) 120A and 120N. Each completion queue CQ may monitor multiple work queues WQs using the same hardware adapter, but there can be many completion queues per hardware adapter. For example, completion queue CQ 620A may monitor all individual work queue pairs in work queues 610A. However, multiple completion queues CQs 620A and 620B may be associated with a single hardware adapter 120A.

The completion queue management mechanism 800 may be activated by the user who wishes to poll for completions, via a check request routine, to perform a CheckRequest( ) function to check for completions across all completion queues CQs 620A–620N in the context of a single thread and multiple threads of operation. In order to coordinate access to the completion queues CQs 620A–620N between multiple threads of operation, the completion queue management mechanism 800 may maintain a count of all completion queues CQs 620A–620N being managed, referred to as CQ Count 810, and a CQ Check Counter 830. The CQ Check Counter 830 may be a 32-bit interlocked counter that increases with every completion queue check and may be used to coordinate accesses to the completion queues CQs 620A–620N among multiple threads.

The CQ Count 810 and CQ Check Counter 830 may be used to create an Index 820 into its CQ List 840. The Index 820 may be used by a single thread of operation to check for completions against a particular completion queue. If a completed request is found, the request may be removed from the corresponding work queue and returned. If no request is located, the thread acquires a new Index 820 and performs additional checks. Each thread of operation may check at most CQ Count times for a completed request before returning that nothing has been located, guaranteeing that the thread does not continue to poll forever.

Threads acquire an Index 820 into the CQ List 840 by using the following equation:

Index=Interlocked Increment(CQ Check Counter) mod CQ Count

The interlocked increment routine atomically adds a discrete value such as one (1) to the CQ Check Counter 830 and returns its new value. Since CQ Check Counter 830 is an interlocked variable, multiple threads accessing the CQ Check Counter 830 do not need to provide additional serialization techniques. Additional serialization may therefore be avoided by taking the modulo of the incremented counter with the value of CQ Count 810. The Index 820 may be set to a value between zero (0) and CQ Count-1 810, providing a valid zero-based index into the CQ List 840.

Once the completion queue management mechanism 800 is activated to perform a CheckRequest( ) function to check for completions across all completion queues CQs 620A–620N, every completion queue is checked in the case of either a single thread or multiple threads. No completion queue may be starved (never checked), however. Other functions of a completion service performed by the completion queue management mechanism 800 such as the Monitoring( ) function (WQP, Direction), the StopMonitoring function (WQP, Direction), the CheckWithReset( ) function, the CheckRequest( ) Alternate #1 and the CheckRequest( ) Alternate #2 may be described in more detailed with reference to FIGS. 10–15 hereinbelow Referring now to FIGS. 9A–9B, single and multiple thread example completion queue checking operations provided by the completion queue management mechanism 800 according to an embodiment of the present invention are illustrated. FIG. 9A refers TABLE 1 for illustrating a completion queue checking operation initiated by a single thread of operation. Similarly, FIG. 9B refers to TABLE 2 for illustrating a completion queue checking operation initiated by multiple threads of operation. Either completion queue checking operation may be activated by a single thread of operation or multiple threads of operation using the CheckRequest( ) function.

As shown in FIG. 9A (TABLE 1), an example single thread of operation may begin polling for completions on multiple completion queues at an arbitrary time P and end at time 2P+1. At arbitrary time P, a thread checks for a completion at CQ0 (see completion queue 620A shown in FIG. 8). No completions are found on CQ0, so a check is made on CQ1 (see completion queue 620B shown in FIG. 8). At time P+1 (next time increment from an arbitrary time P), a completion is found at CQ1, and the thread returns to the user (service library). Polling is then resumed at time 2P on CQ2 (see completion queue 620C shown in FIG. 8). No completions are found, so a check is made on CQ3 (see completion queue 620N shown in FIG. 8), resulting in a completion being found at time 2P+1. The thread then returns to the user (service library).

As shown in FIG. 9B (TABLE 2), an example multiple threads of operation may begin polling for completions on multiple completion queues at an arbitrary time P and end at time 2P+3. Threads #1 and #2, for example, may begin polling for completions at time P. However, the number of threads may not be limited thereto. The Index of the CheckRequest( ) function guarantees that threads #1 and #2 check different completion queues CQs. For example, thread #1 may check CQ0 (see completion queue 620A shown in FIG. 8), while thread #2 may check CQ1 (see completion queue 620B shown in FIG. 8). At time P, thread #1 checks for a completion at CQ0. However, no completions are found on CQ0. Meanwhile, thread #2 checks for a completion at CQ1. There, a completion is found at CQ1, that is, a completed request is located at CQ1, the thread #2 returns to the user. When no completions are found on CQ0, thread #1 performs a check on CQ2 (see completion queue 620C shown in FIG. 8) at time P+1. If no completions are found on CQ2, a check is then made on CQ3 (see completion queue 620N shown in FIG. 8) at time P+2. There, a completion is found at CQ3, and the thread #1 returns to the user.

During the next polling interval, thread #1 locates a completion on CQ0. Thread #2 examines CQ1, CQ2, CQ3, and CQ0, respectively, before returning without having located a completion. Note that during the second polling interval, all completion queues CQ0–CQ3 (see completion queue 620C–620N shown in FIG. 8) are checked. In the absence of completed requests, this holds true so as to ensure that a completion queue CQ does not starve (is never checked) and that completion checking halts. This way a single thread or multiple threads of operation may process completed work requests. A single completion service may monitor multiple work queues across many hardware adapters while flexibly supporting both polling and event-driven completion operation models.

FIG. 10 illustrates an example implementation of a Monitor( ) function as performed by an example completion queue management mechanism 800 for monitoring work queues for inbound and outbound completions according to an embodiment of the present invention. As shown in FIG. 10, the Monitor( ) function is invoked by a user to begin monitoring different inbound (receive) and outbound (send) work queues of a work queue pair WQP for inbound and outbound completions respectively at block 1010. The completion queue management mechanism 800 next activates a StopMonitoring( ) function to ensure that the work queue pair WQP does not appear in the WQP list twice at block 1020, and then acquires a lock to serialize accesses to the WQP list at block 1030. Such a lock may mutually exclude other threads from operation and ensure that the WQP list may not be corrupted.

After the lock is acquired at block 1030, the completion queue management mechanism 800 proceeds to either add the work queue from either the inbound (receive) or outbound (send) direction to the WQP list. Specifically, the completion queue management mechanism 800 determines whether a direction of the work queue WQ is outbound (send) at block 1040. If the direction of the work queue WQ is outbound, the completion queue management mechanism 800 en-queues (adds) outbound work queue WQ on the WQP list at block 1050. However, if the direction of the work queue WQ is not outbound, then the completion queue management mechanism 800 determines whether the direction of the work queue WQ is inbound instead at block 1050. If the direction of the work queue WQ is inbound, then the completion queue management mechanism 800 en-queues (adds) inbound work queue WQ on the WQP list at block 1070. Afterwards, the completion queue management mechanism 800 releases the lock at block 1080 and allows the thread to return to the user where other completion queue checking functions may be invoked at block 1090.

Figure 11:
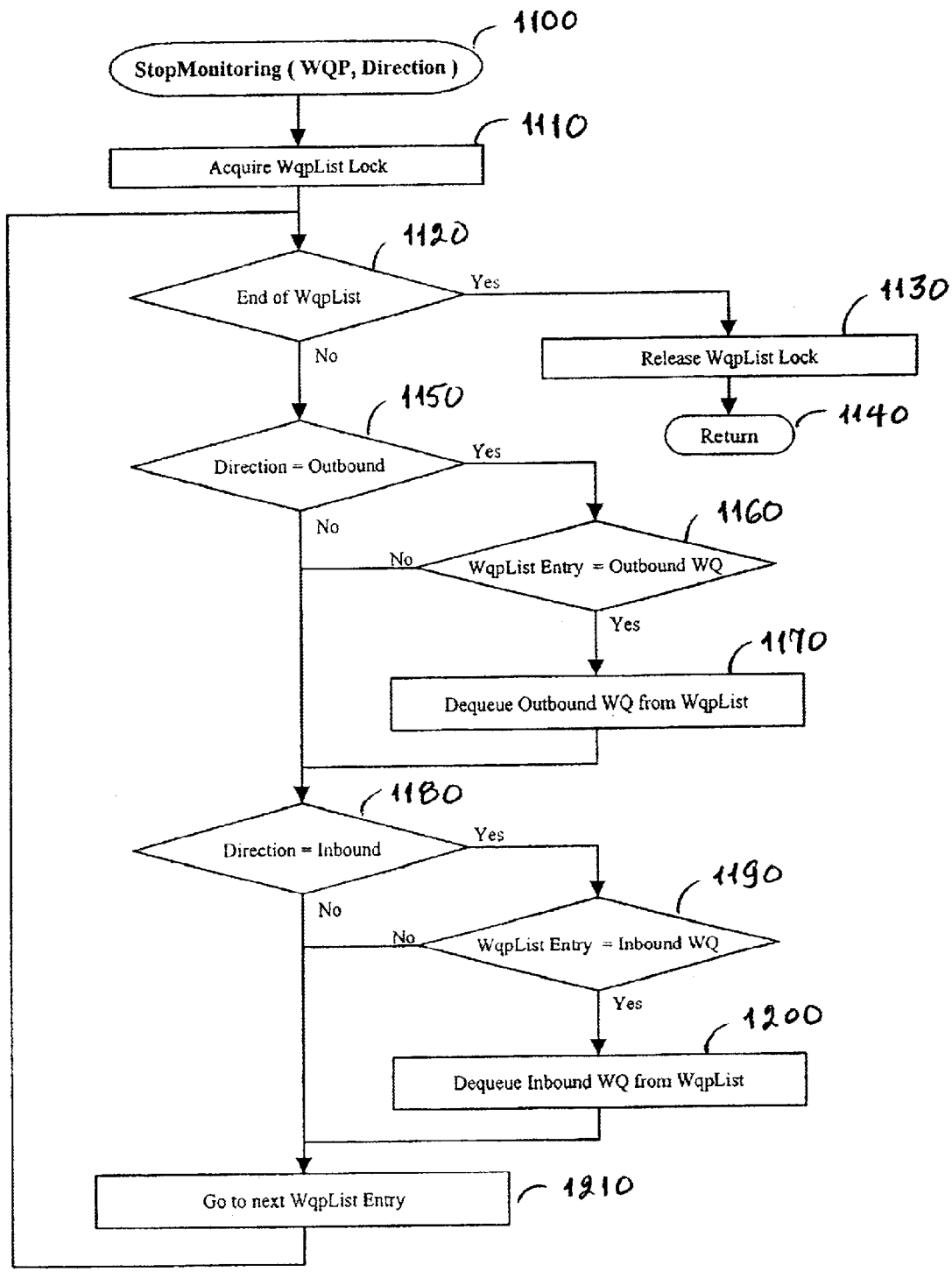
FIG. 11 illustrates an example completion queue stop monitoring process performed by an example completion queue management mechanism for stop monitoring work queues for inbound and outbound completions according to an embodiment of the present invention.

FIG. 11 illustrates an example implementation of a StopMonitoring( ) function as performed by an example completion queue management mechanism 800 for stop monitoring work queues for inbound and outbound completions according to an embodiment of the present invention. As shown in FIG. 11, the StopMonitoring( ) function is invoked by a user to stop monitoring different inbound (receive) and outbound (send) work queues of a work queue pair WQP for inbound and outbound completions respectively at block 1100. The StopMonitoring( ) function may be utilized by the user to notify to the completion queue management mechanism 800 that access to work queues WQs is no longer needed. Once the StopMonitoring( ) function is invoked by the user, the completion queue management mechanism 800 acquires a lock to serialize accesses to the WQP list at block 1110. Again, such a lock may mutually exclude other threads from operation and ensure that the WQP list may not be corrupted.

After the lock is acquired at block 1110, the completion queue management mechanism 800 determines whether the monitor of work queues is at the end of WQP list at block 1120. For example, if the WQP list contains four (4) work queue pairs, then the completion queue management mechanism 800 determines whether all four (4) work queue pairs in the WQP list have been checked. If all work queue pairs WQPs have been checked at block 1120, then the completion queue management mechanism 800 releases the lock at block 1130 and allows the thread to return to the user where other completion queue checking functions may be invoked at block 1140.

If, on the other hand, not all work queue pairs WQPs have been checked at block 1120, the completion queue management mechanism 800 proceeds to either remove the work queue from either the inbound (receive) or outbound (send) direction to the WQP list. Specifically, the completion queue management mechanism 800 determines whether a direction of the work queue WQ is outbound (send) at block 1150. If the direction of the work queue WQ is outbound, the completion queue management mechanism 800 determines whether the current WQP in the WQP list corresponds to the one the user specifies at block 1160. In other words, the completion queue management mechanism 800 checks if the outbound WQ corresponds to the WQP list entry. If the outbound WQ corresponds to the WQP list entry at block 1160, then the completion queue management mechanism 800 removes the WQP list entry (de-queues outbound WQ) from the WQP list at block 1170.

However, if the direction of the work queue WQ is not outbound, then the completion queue management mechanism 800 determines whether the direction of the work queue WQ is inbound instead at block 1180. If the direction of the work queue WQ is inbound, then the completion queue management mechanism 800 determines whether the current WQP in the WQP list corresponds to the one the user specifies at block 1190. In other words, the completion queue management mechanism 800 checks if the inbound WQ corresponds to the WQP list entry. If the outbound WQ corresponds to the WQP list entry at block 1190, then the completion queue management mechanism 800 removes the WQP list entry (de-queues inbound WQ) from the WQP list at block 1200.

Next, the completion queue management mechanism 800 proceeds to the next WQP list entry at block 1210 and returns to block 1120 to check whether all work queue pairs WQPs in the WQP list have been checked. Alternatively, the completion queue management mechanism 800 may also proceed to the next WQP list entry at block 1210 after having de-queued outbound WQ from the WQP list at block 1170. Until all work queue pairs WQPs have been checked, the completion queue management mechanism 800 releases the lock at block 1130 and allows the thread to return to the user where other completion queue checking functions may be invoked at block 1140.

Figure 12:
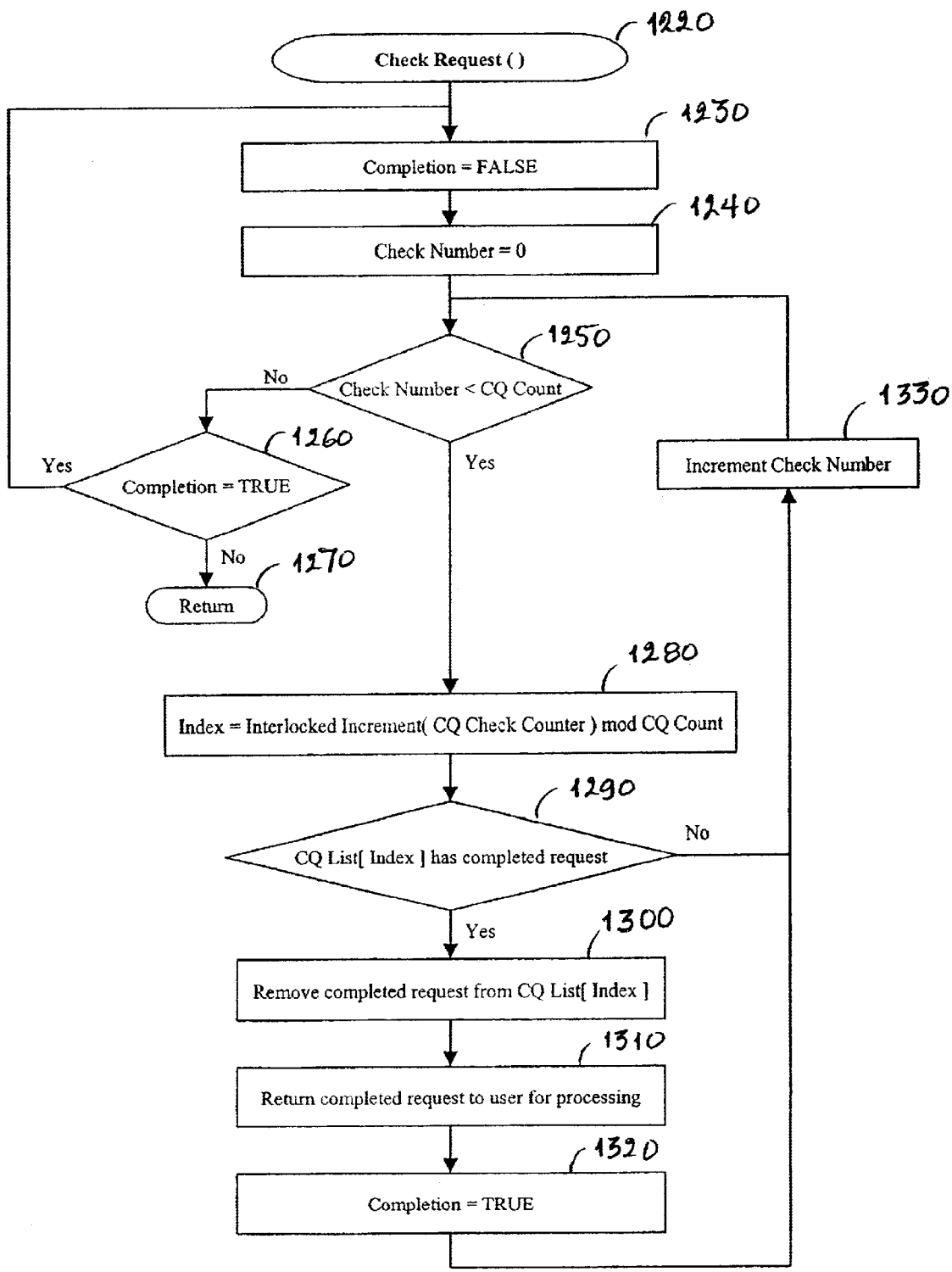
FIG. 12 illustrates an example completion queue check request process performed by an example completion queue management mechanism for checking for completions on all work queues monitored by the completion service according to an embodiment of the present invention.

FIG. 12 illustrates an example implementation of a CheckRequest( ) function as performed by an example completion queue management mechanism 800 for checking for completions on all work queues monitored by the completion service according to an embodiment of the present invention. As shown in FIG. 12, the CheckRequest( ) function is invoked directly by a user polling for completions or indirectly by a CompletionEvent triggered by a completion to check for and process completed descriptors on all work queues monitored by the completion service at block 1220. Before the CheckRequest( ) function is invoked, the completion queue management mechanism 800 initializes the counters, CQ Count 810 and CQ Check Counter 830 shown in FIG. 8 at block 1230 and block 1240. The completion queue management mechanism 800 sets a completion (i.e., boolean flag which indicates whether a completion is found during checking operation) equal to FALSE at block 1230 and a check number equal to zero (0) at block 1240.

Next, the completion queue management mechanism 800 checks if the check number is less than a CQ Count 810 at block 1250. In other words, the completion queue management mechanism 800 determines whether all completion queues CQs (see completion queues 620A–620N shown in FIG. 8) have been checked. If the check number is not less than a CQ Count 810 (that is, if all completion queues CQs have been checked), the completion queue management mechanism 800 determines if a completion (i.e., boolean flag which indicates whether a completion is found during checking operation) equals to TRUE at block 1260. A completion corresponds to TRUE if a completion is found, the completion queue management mechanism 800 returns to block 1230; otherwise, the completion queue management mechanism 800 allows the thread to return to the user where other completion queue checking functions may be invoked at block 1270.

However, if the check number is less than a CQ Count 810 (that is, if all completion queues CQs have not been checked), the completion queue management mechanism 800 uses the CQ Count 810 and CQ Check Counter 830 to create an Index into its CQ List 840 to check for completions against a particular completion queue. The Index is acquired using the following equation: Index=Interlocked Increment (CQ Check Counter) mod CQ Count to determine which particular completion queue to check at block 1290.

Next, the completion queue management mechanism 800 checks if the CQ List[Index] has a completed request at block 1290. The Index indicates an entry of the CQ list for checking purposes. For example, if an Index is five (5), then the $5^{th}$ item on the CQ list may be checked for completed request. If the CQ List[Index] does not have a completed request, the completion queue management mechanism 800 increments the check number at block 1330 and returns to block 1250 to check if the check number is less than a CQ Count 810. However, if the CQ List[Index] has a completed request, the completion queue management mechanism 800 removes the completed request from the CQ List[Index] at block 1300, returns the completed request to the user for processing the completed request to notify the user that a request has completed at block 1310. Then, the completion queue management mechanism 800 indicates that a completion (i.e., boolean flag which indicates whether a completion is found during checking operation) equals to TRUE at block 1320 to signal that a completion is found. The completion queue management mechanism 800 then proceeds to block 1330 to increment the check number and returns to block 1250 to continue checking for other completion queues until all completion queues CQs have been checked and no new completion queue CQ has been found.

Figure 13:
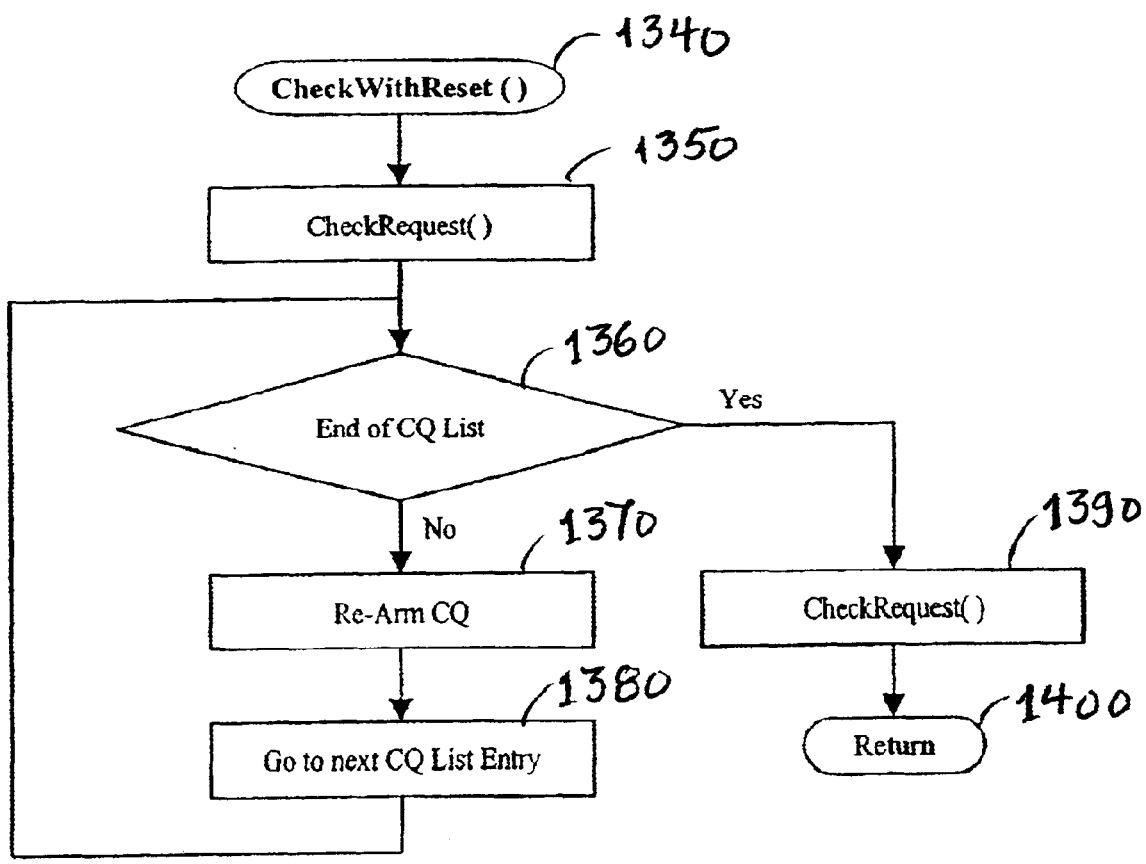
FIG. 13 illustrates an example completion queue check with reset process performed by an example completion queue management mechanism for checking with reset for completions on all work queues monitored by the completion service according to an embodiment of the present invention.

FIG. 13 illustrates an example implementation of a CheckWithReset( ) function as performed by an example completion queue management mechanism 800 for checking with reset for completions on all work queues monitored by the completion service according to an embodiment of the present invention. As shown in FIG. 13, the CheckWithReset( ) function is invoked by a Completion-Event at block 1340. Once the CheckWithReset( ) function is invoked, the completion queue management mechanism 800 checks for all completions across all completion queues CQs, via CheckRequest( ) function, at block 1350. Once all completions have been processed, the completion queue management mechanism 800 checks whether the completion queue CQ is at the end of CQ List 840 at block 1360. If the completion queue is not at the end of the CQ List, then the completion queue management mechanism 800 re-arms the completion queue so as to enable signaling a CompletionEvent at block 1370, and proceeds to the next entry of the CQ List 840 at block 1380 until the completion queue CQ is at the end of CQ List 840 at block 1360. If the completion queue CQ is at the end of CQ List 840 at block 1360, the completion queue management mechanism 800 again checks for all completions across all completion queues CQs, via another CheckRequest( ) function to avoid a race condition, at block 1390 and may return to an interrupt service routine (ISR) of an operating system.

Figure 14:
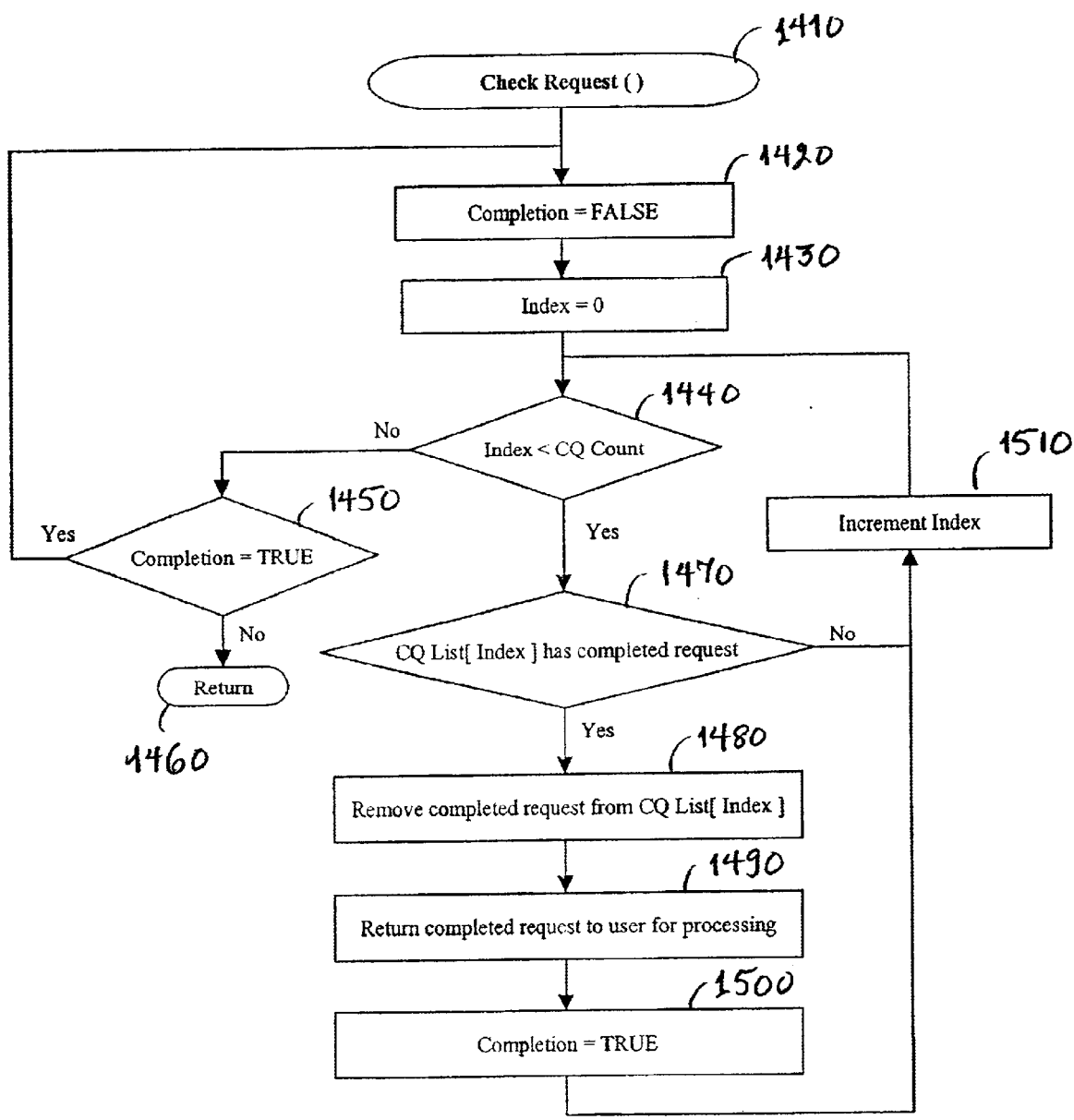
FIG. 14 illustrates a first alternate completion queue check request process according to an embodiment of the present invention.
Figure 15:
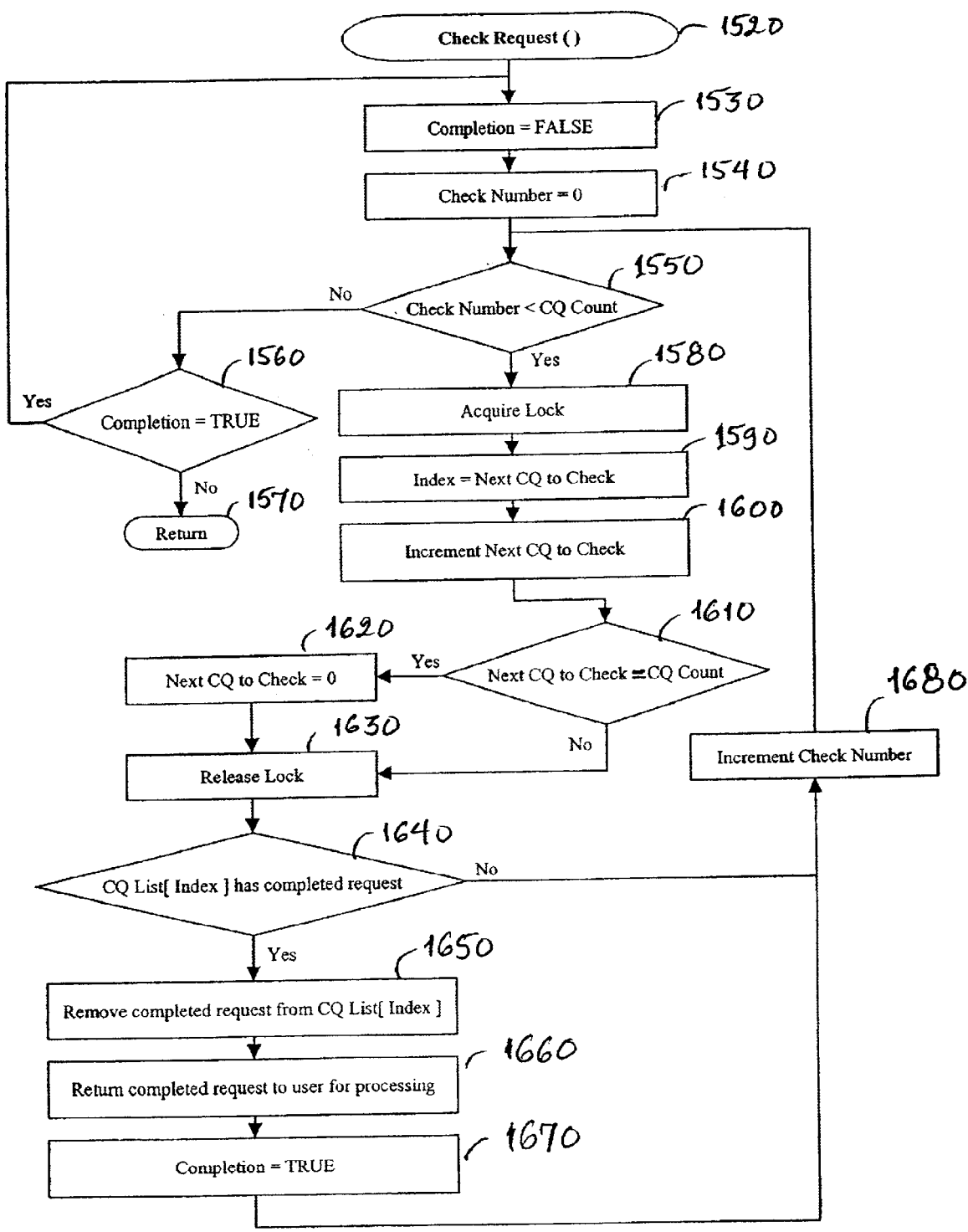
FIG. 15 illustrates a second alternate completion queue check request process according to an embodiment of the present invention.

FIGS. 14–15 illustrate first and second alternates of the CheckRequest( ) function as performed by an example completion queue management mechanism 800 according to an embodiment of the present invention. Specifically, FIG. 14 illustrates a CheckRequest( ) function Alternate #1 as performed by an example completion queue management mechanism 800. As shown in FIG. 14, a CheckRequest( ) function is invoked directly by a user polling for completions or indirectly by a CompletionEvent triggered by a completion to check for and process completed descriptors on all work queues monitored by the completion service at block 1410. Before the CheckRequest( ) function is invoked, the completion queue management mechanism 800 initializes the counters, CQ Count 810 and CQ Check Counter 830 shown in FIG. 8. The completion queue management mechanism 800 sets a completion (i.e., boolean flag which indicates whether a completion is found during checking operation) equal to FALSE at block 1420 and an Index equal to zero (0) at block 1430.

Next, the completion queue management mechanism 800 checks if the Index is less than a CQ Count 810 at block 1440. In other words, the completion queue management mechanism 800 determines whether all completion queues CQs (see completion queues 620A–620N shown in FIG. 8) have been checked. If the Index is not less than a CQ Count 810 (that is, if all completion queues CQs have been checked), the completion queue management mechanism 800 determines if a completion (i.e., boolean flag which indicates whether a completion is found during checking operation) equals to TRUE at block 1450. A completion corresponds to TRUE if a completion is found, the completion queue management mechanism 800 returns to block 1420; otherwise, the completion queue management mechanism 800 allows the thread to return to the user where other completion queue checking functions may be invoked at block 1460.

However, if the Index is less than a CQ Count 810 (that is, if all completion queues CQs have not been checked), the completion queue management mechanism 800 checks if the CQ List[Index] has a completed request at block 1470. The Index indicates an entry of the CQ list for checking purposes. If the CQ List[Index] does not have a completed request, the completion queue management mechanism 800 increments the Index at block 1510 and returns to block 1440 to check if the check number is less than a CQ Count 810. However, if the CQ List[Index] has a completed request, the completion queue management mechanism 800 removes the completed request from the CQ List[Index] at block 1480, returns the completed request to the user for processing the completed request to notify the user that a request has completed at block 1490. Then, the completion queue management mechanism 800 indicates that a completion (i.e., boolean flag which indicates whether a completion is found during checking operation) equals to TRUE at block 1500 to signal that a completion is found. The completion queue management mechanism 800 then proceeds to block 1510 to increment the Index and returns to block 1440 to continue checking for other completion queues until all completion queues CQs have been checked and no new completion queue CQ has been found.

FIG. 15 illustrates a CheckRequest( ) function Alternate #2 as performed by an example completion queue management mechanism 800. As shown in FIG. 15, a CheckRequest( ) function is likewise invoked directly by a user polling for completions or indirectly by a Completion-Event triggered by a completion to check for and process completed descriptors on all work queues monitored by the completion service at block 1520. Before the CheckRequest( ) function is invoked, the completion queue management mechanism 800 initializes the counters, CQ Count 810 and CQ Check Counter 830 shown in FIG. 8. The completion queue management mechanism 800 sets a completion (i.e., boolean flag which indicates whether a completion is found during checking operation) equals to FALSE at block 1530 and an Index equals to zero (0) at block 1540.

Next, the completion queue management mechanism 800 checks if the check number is less than a CQ Count 810 at block 1550. In other words, the completion queue management mechanism 800 determines whether all completion queues CQs (see completion queues 620A–620N 620N shown in FIG. 8) have been checked. If the check number is not less than a CQ Count 810 (that is, if all completion queues CQs have been checked), the completion queue management mechanism 800 determines if a completion (i.e., boolean flag which indicates whether a completion is found during checking operation) equals to TRUE at block 1560. A completion corresponds to TRUE if a completion is found, the completion queue management mechanism 800 returns to block 1530; otherwise, the completion queue management mechanism 800 allows the thread to return to the user where other completion queue checking functions may be invoked at block 1570.

However, if the check number is less than a CQ Count 810 (that is, if all completion queues CQs have not been checked), the completion queue management mechanism 800 first acquires the lock to exclude other threads from operation at block 1580, sets the Index to correspond to the next completion queue CQ to check at block 1590, and then increments the next completion queue CQ to check at block 1600. Afterwards, the completion queue management mechanism 800 determines if the next completion queue CQ to check is equal to the CQ Count 810 at block 1610. If the next completion queue CQ to check is equal to the CQ Count 810, the completion queue management mechanism 800 sets the next CQ to check to zero (0) at block 1620, and then releases the lock at block 1630.

Next, the completion queue management mechanism 800 checks if the CQ List[Index] has a completed request at block 1640. The Index indicates an entry of the CQ list for checking purposes. If the CQ List[Index] does not have a completed request, the completion queue management mechanism 800 increments the check number at block 1680 and returns to block 1550 to check if the check number is less than a CQ Count 810. However, if the CQ List[Index] has a completed request, the completion queue management mechanism 800 removes the completed request from the CQ List[Index] at block 1650, returns the completed request to the user for processing the completed request to notify the user that a request has completed at block 1660. Then, the completion queue management mechanism 800 indicates that a completion (i.e., boolean flag which indicates whether a completion is found during checking operation) equals to TRUE at block 1670 to signal that a completion is found. The completion queue management mechanism 800 then proceeds to block 1680 to increment the check number and returns to block 1550 to continue checking for other completion queues until all completion queues CQs have been checked and no new completion queue CQ has been found.

As described with reference to FIGS. 14–15, the CheckRequest( ) Alternate #1 as performed by an example completion queue management mechanism 800 is slightly different from the CheckRequest( ) function in that the Index is used in lieu of the check number when compared with the CQ Count 810. Coordinate activities between multiple threads may be avoided. However, the possibility that a completion queue may be starved does exist. In contrast to the CheckRequest( ) Alternate #1, the CheckRequest( ) Alternate #2 uses the same check number but a different method to determine the Index in order to avoid starvation. However, multiple threads may required to serialize their accesses setting an Index. Therefore, expensive serialization routines from the use of spinlocks may be necessary. However, in either CheckRequest( ) Alternate #1 and Alternate #2, every completion queues CQs may be checked for completions.

As described from the foregoing, the completion queue management mechanism according to an embodiment of the present invention advantageously provides a single completion service to monitor multiple work queues in a host system with multiple hardware adapters (HCAs) with multiple ports available for redundancy and multiple switched fabrics while ensuring that a completion queue does not starve (is never checked) and flexibly supporting both polling and event-driven completion operation models. Multiple completion queues (CQ) are efficiently checked in the context of multiple threads without the need for expensive locking or serialization techniques and processing completion events for optimal use of limited system resources.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO) and Future I/O (FIO) and Server Net, and a LAN system including Ethernet, FDDI (Fiber Distributed Data Interface) Token Ring LAN, Asynchronous Transfer Mode (ATM) LAN, Fiber Channel, and Wireless LAN. More importantly, hardware equivalence of the completion queue management mechanism may be implemented in lieu of software-based CQ Count, Index, CQ Check Counter for checking multiple completion queues with a single interface function call while insuring that all completion queues are eventually checked without starvation and avoiding expensive locking or serialization routines to provide better system performance. However, such a hardware equivalence must be arranged separately from multiple hardware adapters. For example, the CQ Counter may be implemented as a register or memory. The Index may be implemented as a temporary register. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A system comprising:
   multiple work queues each configured to send and receive message data via one or more hardware adapters;
   multiple completion queues each configured to coalesce completions from multiple work queues belonging to a single hardware adapter; and
   a completion queue management mechanism configured to check for completions across multiple completion queues in the context of either a single thread or multiple threads of operation;
   wherein said completion queue management mechanism is installed in kernel-level device drivers of a host operating system (OS) to provide a single completion service for checking for completion events across said multiple completion queues and processing said completion events; and
   wherein said single completion service is provided with the following:
   a first function which, when invoked, monitors different work queues for inbound and outbound completions respectively in respective work queue list;
   a second function which, when invoked, stops monitoring different work queues for inbound and outbound completions from respective work queue list;
   a third function which, when invoked, checks for completion events across said multiple completion queues and processes said completion events; and
   a fourth function which, when invoked, resets all work queues that had completion events and performs an additional check on the work queues for completion events.

2. The system as claimed in claim 1, wherein said completion queue management mechanism is installed in kernel-level device drivers of a host operating system (OS) to provide a single completion service for checking for completion events across said multiple completion queues and performing post processing of said completion events, including invoking user callback routines to notify the user of completed operations.

3. The system as claimed in claim 1, wherein said multiple work queues are formed in pairs with each work queue pair including an inbound queue for receiving messages and an outbound queue for requesting message sends, remote direct memory access (RDMA) reads and remote direct memory access (RDMA) writes.

4. The system as claimed in claim 1, wherein said first function, said second function, said third function, and said fourth function are implemented using a high-level programming language selected from a group of C, C++, and Visual Basic.

5. The system as claimed in claim 4, wherein said first function is executed by said completion queue management mechanism to monitor for different work queues by:

seizing a lock to exclude other threads from operation;

determining whether a direction of the work queue is outbound or inbound;

if the direction of the work queue is outbound, en-queueing the outbound work queue on the work queue pair list;

if the direction of the work queue is inbound, en-queueing the inbound work queue on the work queue pair list; and releasing the lock and allowing the thread to return to a user where other completion queue checking functions may be invoked.

6. The system as claimed in claim 4, wherein said second function is executed by said completion queue management mechanism to stop monitoring for different work queues by:

seizing a lock to exclude other threads from operation;

determining whether a monitor of multiple work queues is at the end of a work queue pair list indicating that all work queue pairs in the work queue pair list have been checked;

if all work queue pairs have been checked, releasing the lock and allowing the thread to return to the user where other completion queue checking functions may be invoked;

if not all work queue pairs have been checked, checking if the inbound or outbound work queue corresponds to an entry of the work queue pair list entry;

if one of the outbound work queue and inbound work queue corresponds to an entry of the work queue pair list, removing the corresponding work queue from the work queue pair list, respectively; and proceeding to a next entry of the work queue pair list to check whether all work queue pairs in the work queue pair list have been checked, and until all work queue pairs in the work queue pair list have been checked, releasing the lock and allowing the thread to return to the user where other completion queue checking functions may be invoked.

7. The system as claimed in claim 4, wherein said fourth function is executed by said completion queue management mechanism by:

checking for all completions across all completion queues;

when all completions have been processed, checking whether the completion queue is at the end of a completion queue list;

if the completion queue is not at the end of the completion queue list, re-arming the completion queue, and proceeding to a next entry on the completion queue list until the completion queue is at the end of the completion queue list; and if the completion queue is at the end of the completion queue list, again checking for all completions across all completion queues, via another check request function to avoid a race condition, and then returning to an interrupt service routine (ISR) of an operating system.

8. The system as claimed in claim 1, wherein said one or more hardware adapters are connected to one or more remote systems, via switched fabrics, and are supported by at least one of the "Virtual Interface (VI) Architecture Specification" and the "Next Generation Input/Output (NGIO) Specification" for message data transfers.

9. A network, comprising:

a switched fabric;

remote systems attached to said switched fabric; and a host system comprising multiple work queues each configured to send and receive message data via one or more hardware adapters; multiple completion queues each configured to coalesce completions from multiple work queues belonging to a single hardware adapter; and an operating system including a completion queue management mechanism installed therein to check for completions across multiple completion queues in the context of either a single thread or multiple threads of operation;

wherein said completion queue management mechanism is installed in kernel-level device drivers of said operating system to provide a single completion service for checking for completion events across said multiple completion queues and processing said completion events; and wherein said single completion service is provided with the following:

a first function which, when invoked, monitors different work queues for inbound and outbound completions respectively in respective work queue list;

a second function which, when invoked, stops monitoring different work queues for inbound and outbound completions from respective work queue list;

a third function which, when invoked, checks for completion events across said multiple completion queues and processes said completion events; and a fourth function which, when invoked, resets all work queues that had completion events and performs an additional check on the work queues for completion events.

10. The network as claimed in claim 9, wherein said completion queue management mechanism is installed in kernel-level device drivers of said operating system to provide a single completion service for checking for completion events across said multiple completion queues and performing post processing of said completion events, including invoking user callback routines to notify the user of completed operations.

11. The network as claimed in claim 9, wherein said multiple work queues are formed in pairs with each work queue pair including an inbound queue for receiving messages and an outbound queue for requesting message sends, remote direct memory access (RDMA) reads and remote direct memory access (RDMA) writes.

12. The network as claimed in claim 9, wherein said first function, said second function, said third function, and said fourth function are implemented using a high-level programming language selected from a group of C, C++, and Visual Basic.

13. The network as claimed in claim 9, wherein said first function is executed by said completion queue management mechanism to monitor for different work queues by:

seizing a lock to exclude other threads from operation;

determining whether a direction of the work queue is outbound or inbound;

if the direction of the work queue is outbound, en-queueing the outbound work queue on the work queue pair list;

if the direction of the work queue is inbound, en-queueing the inbound work queue on the work queue pair list; and releasing the lock and allowing the thread to return to a user where other completion queue checking functions may be invoked.

14. The network as claimed in claim 9, wherein said second function is executed by said completion queue management mechanism to stop monitoring for different work queues by:

seizing a lock to exclude other threads from operation;

determining whether a monitor of multiple work queues is at the end of a work queue pair list indicating that all work queue pairs in the work queue pair list have been checked;

if all work queue pairs have been checked, releasing the lock and allowing the thread to return to the user where other completion queue checking functions may be invoked;

if not all work queue pairs have been checked, checking if the inbound or outbound work queue corresponds to an entry of the work queue pair list entry;

if one of the outbound work queue and inbound work queue corresponds to an entry of the work queue pair list, removing the corresponding work queue from the work queue pair list, respectively; and proceeding to a next entry of the work queue pair list to check whether all work queue pairs in the work queue pair list have been checked, and until all work queue pairs in the work queue pair list have been checked, releasing the lock and allowing the thread to return to the user where other completion queue checking functions may be invoked.

15. The network as claimed in claim 9, wherein said fourth function is executed by said completion queue management mechanism by:

checking for all completions across all completion queues;

when all completions have been processed, checking whether the completion queue is at the end of a completion queue list;

if the completion queue is not at the end of the completion queue list, re-arming the completion queue, and proceeding to a next entry on the completion queue list until the completion queue is at the end of the completion queue list; and if the completion queue is at the end of the completion queue list, again checking for all completions across all completion queues, via another check request function to avoid a race condition, and then returning to an interrupt service routine (ISR) of an operating system.

16. The network as claimed in claim 9, wherein said host system and said remote systems are supported by at least one of the "*Virtual Interface (VI) Architecture Specification*" and the "*Next Generation Input/Output (NGIO) Specification*" for message data transfers.

17. The network as claimed in claim 9, wherein said host system and said remote systems represent channel endpoints of a data network implemented in compliance with the "*Next Generation Input/Output (NGIO) Specification*", and data channels formed between said host system and said remote systems, via said switched fabrics, are supported by the "*Virtual Interface (VI) Architecture Specification*" and the "*Next Generation Input/Output (NGIO) Specification*" for message data transfers.

18. A process of checking for completion events across multiple completion queues in a host system having multiple hardware adapters, comprising:

configuring multiple completion queues each to coalesce completions from multiple work queues belonging to a single hardware adapter; and activating a single completion service to check for completion events across multiple completion queues in the context of either a single thread or multiple threads of operation;

wherein said single completion service is further provided with the following:

a first function which, when invoked, monitors different work queues for inbound and outbound completions respectively in respective work queue list;

a second function which, when invoked, stops monitoring different work queues for inbound and outbound completions from respective work queue list;

a third function which, when invoked, checks for completion events across said multiple completion queues and processes said completion events; and a fourth function which, when invoked, resets all work queues that had completion events and performs an additional check on the work queues for completion events.

19. The process as claimed in claim 18, further performing post processing of said completion events, including invoking user callback routines to notify the user of completed operations.

20. The process as claimed in claim 18, wherein said single completion service supports both polling and interrupt driven completion models while avoiding system interrupts by processing completion events across multiple work queues on multiple hardware adapters.

21. The process as claimed in claim 20, wherein said multiple work queues are formed in pairs with each work queue pair including an inbound queue for receiving messages and an outbound queue for requesting message sends, remote direct memory access (RDMA) reads and remote direct memory access (RDMA) writes.

22. The process as claimed in claim 18, wherein said first function, said second function, said third function, and said fourth function are implemented using a high-level programming language selected from a group of C, C++, and Visual Basic.

23. A computer-readable medium that stores computer-executable instructions for checking for completion events across multiple completion queues in a host system having multiple hardware adapters, said computer-executable instructions causing said computer system to:

configure said multiple completion queues each to coalesce completions from multiple work queues belonging to a single hardware adapters; and activate a single completion service to check for completion events across multiple completion queues in the context of either a single thread or multiple threads of operation;

wherein said single completion service is further provided with the following:

a monitor function which, when invoked, monitors different work queues for inbound and outbound completions respectively in respective work queue list;

a first function which, when invoked, stops monitoring different work queues for inbound and outbound completions from respective work queue list;

a second function which, when invoked, checks for completion events across said multiple completion queues and processes said completion events; and a third function which, when invoked, resets all work queues that had completion events and performs an additional check on the work queues for completion events.

24. The medium as claimed in claim 23, said computer-executable instructions further causing said computer system to perform post processing of said completion events, including invoking user callback routines to notify the user of completed operations.

25. The medium as claimed in claim 23, wherein said single completion service supports both polling and interrupt driven completion models while avoiding system interrupts by processing completion events across multiple work queues on multiple hardware adapters.

26. The medium as claimed in claim 25, wherein said multiple work queues are formed in pairs with each work queue pair including an inbound queue for receiving messages and an outbound queue for requesting message sends, remote direct memory access (RDMA) reads and remote direct memory access (RDMA) writes.

27. The medium as claimed in claim 23, said computer-executable instructions further causing said computer system to implement said first function, said second function, said third function, and said fourth function using a high-level programming language selected from a group of C, C++, and Visual Basic.

* * * * *